US011231718B2

(12) United States Patent
Fernandez Guzmann

(10) Patent No.: US 11,231,718 B2
(45) Date of Patent: Jan. 25, 2022

(54) ROBUST DIGITAL CONTROLLER FOR SKID-STEER MACHINE

(71) Applicant: AGCO International GmbH, Marktoberdorf (DE)

(72) Inventor: Benjamin Fernando Fernandez Guzmann, Kempten (DE)

(73) Assignee: AGCO International GmbH, Neuhausen (CH)

( * ) Notice: Subject to any disclaimer, the term of this patent is extended or adjusted under 35 U.S.C. 154(b) by 199 days.

(21) Appl. No.: 16/420,561

(22) Filed: May 23, 2019

(65) Prior Publication Data

US 2019/0361455 A1 Nov. 28, 2019

Related U.S. Application Data

(60) Provisional application No. 62/676,342, filed on May 25, 2018.

(51) Int. Cl.
*G05D 1/02* (2020.01)
*E02F 9/26* (2006.01)
*E02F 9/20* (2006.01)

(52) U.S. Cl.
CPC ........... *G05D 1/0221* (2013.01); *E02F 9/205* (2013.01); *E02F 9/265* (2013.01); *G05D 1/0268* (2013.01); *G05D 2201/0202* (2013.01)

(58) Field of Classification Search
CPC ............... G05D 1/0221; G05D 1/0268; G05D 2201/0202; G05D 2201/0201; G05D 1/0212; E02F 9/205; E02F 9/265; A01B 69/004; B62D 1/283; B62D 11/003

See application file for complete search history.

(56) References Cited

U.S. PATENT DOCUMENTS

2013/0261897 A1\* 10/2013 Potter ..................... B62D 6/00
701/42

OTHER PUBLICATIONS

Golconda, Suresh, "Steering Control for a Skid-Steered Autonomous Ground Vehicle at Varying Speed", Published Feb. 23, 2005, pp. 1-51.
European Patent Office, Search Report for related European Application No. EP 19 17 5274, dated Nov. 4, 2019.

\* cited by examiner

*Primary Examiner* — Anne Marie Antonucci

(57) ABSTRACT

An autonomous skid-steer machine includes a chassis, a plurality of ground engaging elements supporting the chassis on a ground surface and one or more computing devices for controlling movement of the machine. The one or more computing devices are configured to generate a control signal for controlling operation of at least some of the plurality of ground engaging elements, the control signal being generated according to a control algorithm incorporating tuning parameters, and to automatically determine the tuning parameters in real time during operation of the machine such that the control algorithm is always optimized for a current speed of the machine. The tuning parameters are found using the machine's current speed, a natural frequency value and a damping value.

13 Claims, 11 Drawing Sheets

ROBUST DIGITAL CONTROLLER FOR SKID-STEER MACHINE

RELATED APPLICATIONS

The present application claims priority under 35 U.S.C. § 119 to U.S. Provisional Application Ser. No. 62/676,342, filed May 25, 2018. The full disclosure, in its entirety, of U.S. Provisional Application Ser. No. 62/676,342 is hereby incorporated by reference.

FIELD

Embodiments of the present invention relate to controllers for skid-steer machines. More particularly, embodiments of the present invention relate to robust digital controllers for skid-steer machines configured to robustly control machine movement in the presence of disturbances and noise.

BACKGROUND

Machinery and processes used in the agriculture industry continue to evolve with advancements in technology. Computer technology and Global Navigation Satellite Systems (GNSS), for example, have enabled the use of automated guidance on a growing number of agricultural machines. Automated guidance enables a machine to automatically follow a designated path without operator control or input and has improved the efficiency of agricultural operations not only by enabling more precise operation (e.g., less overlap and fewer missed areas), but also by allowing the operator to focus on other areas of the machine's operation, such as user-defined settings that can affect performance and efficiency.

Another technology that is increasingly of interest within the agriculture industry is full machine automation. A machine that is fully automated may be operated without any user input or control and, therefore, may be designed without an operator seat or cabin. Eliminating operator space renders machine design more flexible. A machine with no operator space, for example, may be smaller and simpler than a manned machine. However, the automated control of such machines must be even more robust than automated guidance on manned machines as there is no operator oversight to handle anomalies in operation or to make corrections.

The above section provides background information related to the present disclosure which is not necessarily prior art.

SUMMARY

An autonomous skid-steer machine for performing agricultural operations according to an embodiment of the invention comprises a chassis, a plurality of ground engaging elements supporting the chassis on a ground surface, and one or more computing devices for controlling movement of the machine. The one or more computing devices are configured to generate a control signal for controlling operation of at least some of the plurality of ground engaging elements to cause the machine to move in a forward direction and to turn the machine, the control signal being generated according to a control algorithm incorporating tuning parameters. The one or more computing devices are also configured to automatically determine the tuning parameters in real time during operation of the machine such that the control algorithm is always optimized for a current speed of the machine, wherein the tuning parameters are found using the machine's current speed, a natural frequency value ($\omega 0$) and a damping value ($\zeta$). The natural frequency value ($\omega 0$) determines reactiveness of the machine as it responds to navigational errors, and the damping value ($\zeta$) determines overshoot of the machine as it responds to navigational errors.

In some embodiments the natural frequency value ($\omega 0$) is fixed, while in other embodiments the natural frequency value ($\omega 0$) is dynamic. In some embodiments the natural frequency value ($\omega 0$) varies linearly as a function of the machine's speed. In some embodiments the damping value ($\zeta$) is fixed, while in other embodiments the damping value ($\zeta$) is dynamic. In some embodiments the damping value ($\zeta$) varies linearly as a function of the machine's speed.

In some embodiments the control signal causes the machine to follow a guidance wayline, and the control algorithm is a linear control algorithm configured to respond to disruptions in the machine's behavior caused by external disturbances by controlling the machine to return to the guidance wayline.

In some embodiments, the one or more computing devices implement an RST control algorithm to generate the control signal and the control parameters are R, S and T values used in the RST controller.

These and other important aspects of the present invention are described more fully in the detailed description below. The invention is not limited to the particular methods and systems described herein. Other embodiments may be used and/or changes to the described embodiments may be made without departing from the scope of the claims that follow the detailed description.

DRAWINGS

Embodiments of the present invention are described in detail below with reference to the attached drawing figures, wherein.

Figure 1:
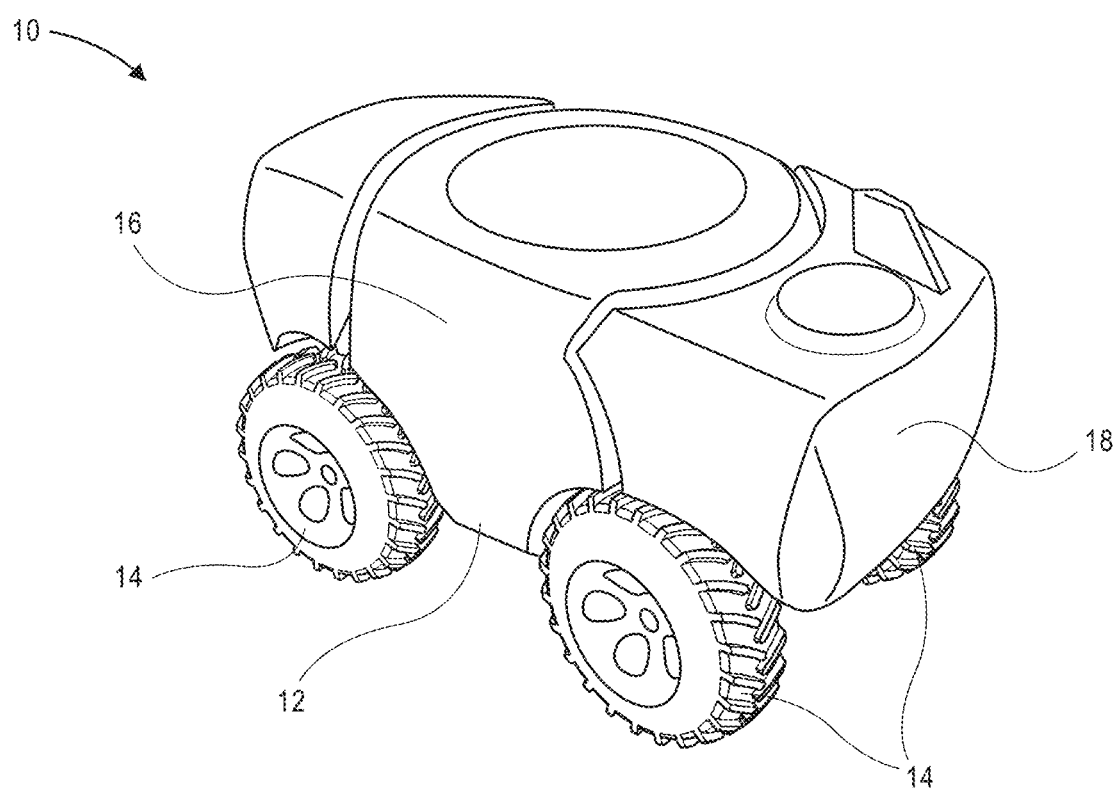
FIG. 1 is a perspective view of an autonomous mobile machine constructed in accordance with embodiments of the invention.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the spirit and scope of the invention as defined by the claims. The following description is, therefore, not to be taken in a limiting sense. Further, it will be appreciated that the claims are not necessarily limited to the particular embodiments set out in this description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

When elements or components are referred to herein as being "connected" or "coupled," the elements or components may be directly connected or coupled together or one or more intervening elements or components may also be present. In contrast, when elements or components are referred to as being "directly connected" or "directly coupled," there are no intervening elements or components present.

Turning now to the drawing figures, and initially FIG. 1, an exemplary mobile machine 10 constructed in accordance with embodiments of the invention is illustrated. The machine 10 is an autonomous vehicle configured to perform an agricultural operation such as planting seeds. The machine 10 includes a chassis 12, four wheels 14, a product holding and distribution system 16, and a communications and control system 18. The four wheels 14 are configured to support the chassis 12 on a ground surface and propel the machine 10 along the ground surface. Two or more of the wheels 14 are driven to propel the machine 10 and each of the wheels 14 is at a fixed angle relative to the chassis 12. In other words, none of the wheels 14 is configured to pivot from side to side to steer the machine 10. Rather, the communications and control system 18 steers the machine 10 by rotating driven wheels on different sides of the machine 10 at different rates—a so-called "skid steer" system. The product holding and distribution system 16 includes a tank (not shown) for holding seeds to be planted in a field. An applicator (not shown) for applying or distributing the product includes a mechanism for placing seed in the ground.

Figure 2:
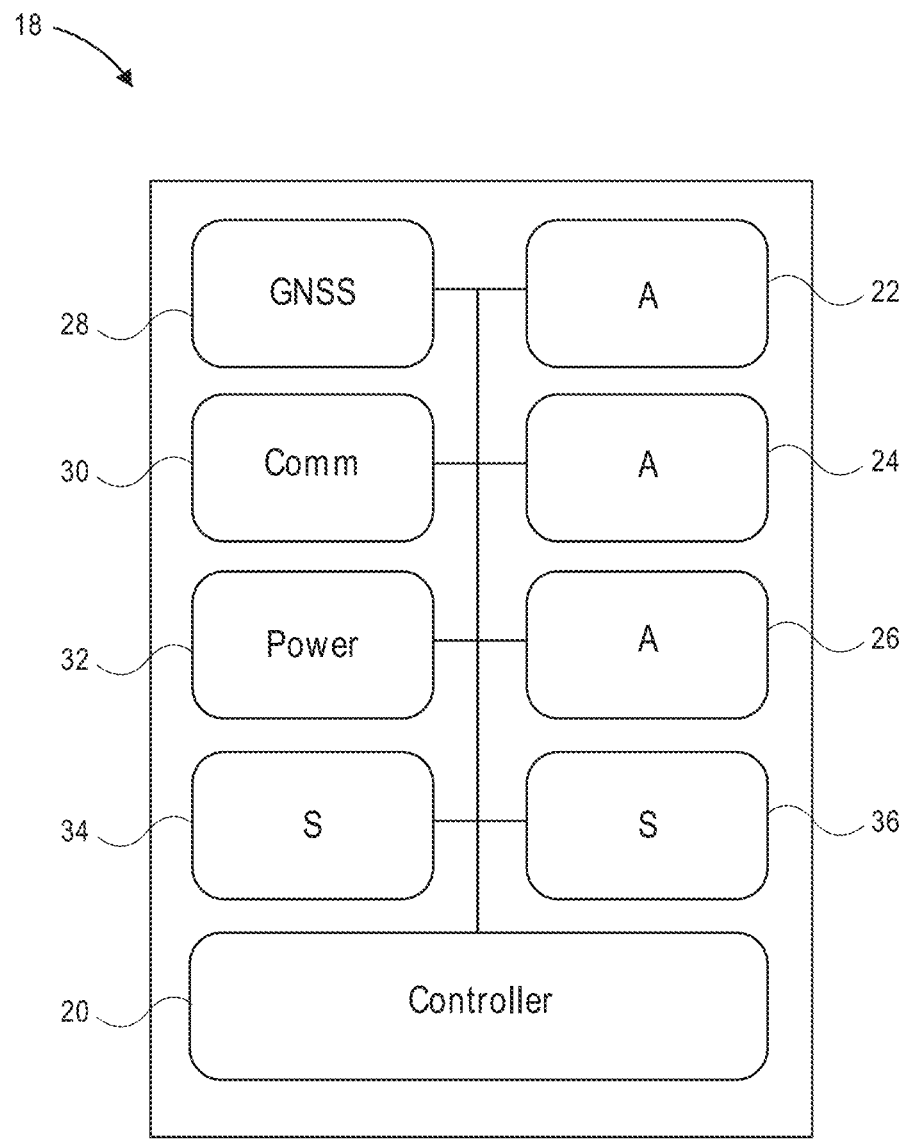
FIG. 2 is a block diagram of a communication and control system of the mobile machine of FIG. 1.

A block diagram depicting various components of the communications and control system 18 is depicted in FIG. 2 and includes a controller 20, two actuators 22, 24 for driving two or more of the wheels 14, an actuator 26 for operating the product holding and distribution system 16, a positioning component 28, a communications component 30, a power source 32, and two or more sensors 34, 36. The actuators 22, 24 for driving the wheels 14 include electric motors with each electric motor driving one of the rear wheels 14. Each of the actuators 22, 24 is driven independently of the other such that the wheels 14 may be operated at different rotational speeds to thereby steer the machine 10. The machine 10 is configured to reach a maximum speed of about one meter per second. The positioning component 28 uses a global navigation satellite system (GNSS) receiver with RTK correction or similar technology to determine a geographic position of the machine 10. The geographic position of the machine 10 may be used, for example, to navigate the machine 10 according to a guidance path and to generate a work record. The communications component 30 enables the machine 10 to communicate wirelessly with external devices or entities such as other autonomous machines and/or a central control unit controlling operation of the machine 10. The power source 32 stores energy and energizes the other components of the machine 10 and may include a rechargeable battery. The sensors 34, 36 collect machine state data, environmental data, or both. Machine state data may include, for example, operating status, fill level of the product holding and distribution system 16 or inertial movement of the machine 10. Environmental data may include, for example, ground surface features or ambient weather information.

The controller 20 communicates with the other components of the communications and control system 18 and generally directs operation of the system 18 and the machine 10. The controller 20 preferably includes a digital integrated circuit and may be or include a general use, commercial off-the-shelf computer processor. Alternatively, the controller 20 may be a programmable logic device configured for operation with the system 18 or may be an application specific integrated circuit (ASIC) especially manufactured for use in the system 18. While illustrated as a single component in the block diagram of FIG. 2, the controller 20 may include two or more separate devices working in cooperation to control operation of the system 18. Furthermore, if the controller 20 includes multiple elements, such as multiple integrated circuits, the elements may be placed at various places on the machine 10 and in wired or wireless communication with each other.

The machine 10 may weigh between thirty and fifty kilograms and be between one-half meter and one meter in length, between one-fourth and one-half meter in width, and between one-fourth meter and one meter in height. It will be appreciated, however, that principles of the present invention may be used with machines of varying sizes, weights and configurations and that the particular size and configuration of the machine 10 is not critical. In some applications it is desirable to use a relatively small machine. Advantages of using relatively small, autonomous machines for agricultural operations include reduced cost, improved scalability, less environmental impact, greater reliability and increased productivity.

The use of relatively small, autonomous machines presents advantages for some agricultural operations. By way of example, small autonomous machines cost less to build because they do not require an operator cabin or operator environment and therefore require fewer materials to build and are simpler to design and manufacture. Operations involving small autonomous machines may be scaled from one or two machines to hundreds of machines depending on the size and needs of the operation, and their operation may be more environmentally friendly because they may be electric, consume less energy and avoid soil damage such as soil compaction. These machines are typically more reliable because each machine is smaller and simpler in design than traditional agricultural equipment, resulting in fewer machine malfunctions or failures and less time to repair when a malfunction or failure occurs. Furthermore, if a group of autonomous machines is used for an operation, the failure or malfunction of one or two machines would typically have limited impact on the overall operation as the remaining machines could continue operating. The use of autonomous machines may result in increased productivity as autonomous machines are not limited by operator availability and may work continuous all day and all night.

The controller 20 controls operation of the actuators 22, 24 to drive movement of the mobile machine 10 to control the lateral position of the mobile machine 10 relative to a target path using a robust digital RST controller that automatically finds the parameters R, S and T using manually shaped sensitivity functions. This approach allows for flexibility in the design of the controller and a deep understanding of how the system reacts to changes in the controller design.

Figures 3, 4:
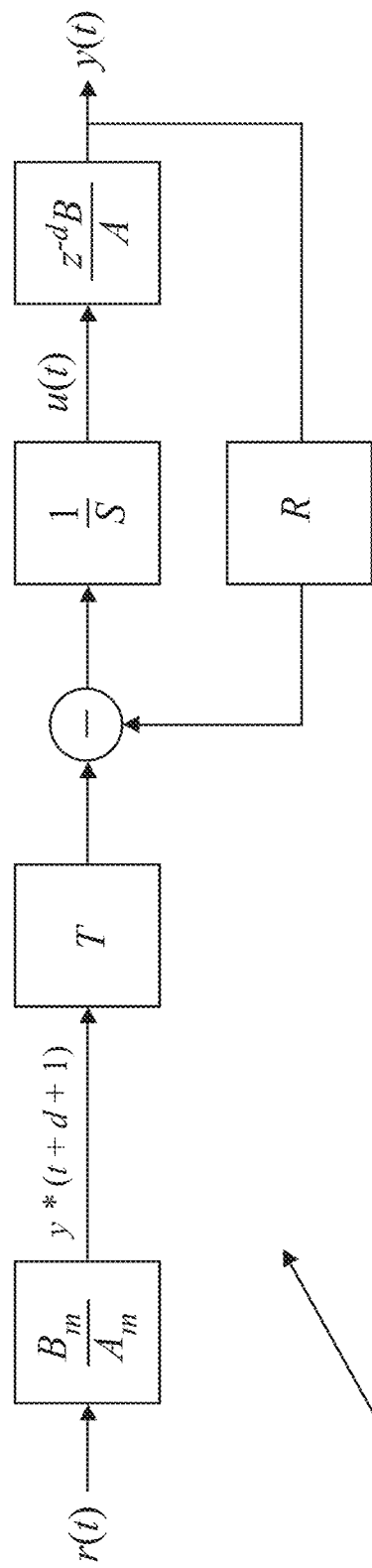
FIG. 3 is a block diagram of a digital canonical controller for tracking and regulation for use in the mobile machine of FIG. 1.
FIG. 4 is a matrix used by the communication and control system to find tuning parameters of a machine control algorithm.

A canonical digital controller 40 commonly referred to as an "RST" controller is illustrated in FIG. 3. The structure of the RST controller 40 allows for imposing different machine dynamics by obtaining the polynomials R and S in order to satisfy the desired regulation performance. The parameter T introduces tracking performance that filters a desired trajectory $y^*(t+d+1)$ from a tracking model system ($B_m/A_m$). The process to be controlled is represented by $$\frac{z^{-d}B}{A}$$

and the closed loop function from the desired trajectory $y^*$ to the output y is represented in equation (1):

$$H_{CL}(z^{-1}) = \frac{z^{-d}B(z^{-1})T(z^{-1})}{A(z^{-1})S(z^{-1}) + z^{-d}B(z^{-1})R(z^{-1})} \quad (1)$$

where d is the time delay and $$A(z^{-1})=1+a_1z^{-1}+\ldots+a_{n_A}z^{-n_A}$$

$$B(z^{-1})=b_1z^{-1}+b_2z^{-2}+\ldots+b_{n_B}z^{-n_B}$$

$$S(z^{-1})=1+s_1z^{-1}+\ldots+s_{n_S}z^{-n_S}$$

$$R(z^{-1})=r_0+r_1z^{-1}+\ldots+r_{n_R}z^{-n_R} \quad (2)$$

To compute the coefficients R and S of the digital controller a Bezout polynomial equation of the following form is used:

$$P(z^{-1})=P_D(z^{-1})P_F(z^{-1})=A(z^{-1})S(z^{-1})+z^{-d}B(z^{-1})R(z^{-1}) \quad (3)$$

The characteristic polynomial P contains dominant and auxiliary poles. The dominant poles $P_D$ are chosen from the digitalization of a second-order system defined by natural frequency ($\omega_0$) and damping ($\zeta$). The digital auxiliary poles $P_F$ improve the robustness of the controller and are normally smaller (faster) than the real part of the dominant poles. Typical values for the auxiliary poles are $-0.05 \leq \alpha_1 \leq -0.5$ and $\alpha_2$ is either set to 0 or the same value as $\alpha_1$ (that is, $\alpha_2 = \alpha_1$). By defining the characteristic equation as follows:

$$P(z^{-1})=1+p_1q^{-1}+\ldots+P_{np}q^{-np} \quad (4)$$

R and S are obtained by solving $$x=M^{-1}p \quad (5)$$

where $$x^T=[1,s_1,\ldots,s_{n_S},r_0,\ldots r_{n_R}]$$

$$p^T=[1,p_1,\ldots,p_{np},0,\ldots 0] \quad (6)$$

and M is defined as set forth in FIG. 4. In FIG. 4 $b'_i=0$ for $i=0, 1, \ldots, d$ and $b'_i=b_{i-d}$ for $i \geq d+1$ and:

$$n_A=\deg A(z^{-1})$$

$$n_B=\deg B(z^{-1})$$

$$n_S=\deg S(z^{-1})=n_B+d-1$$

$$n_P=\deg R(z^{-1})=n_A-1$$

$$n_P=\deg P(z^{-1}) \leq n_A+n_B+d-1 \quad (7)$$

The reference model $$H_m = \frac{B_m}{A_m}$$

generates an output y that follows a desired trajectory $y^*$ each time a reference r changes. The reference r represents a raw target path segment and may change abruptly when, for example, the machine reaches a headland and must make a sharp turn. The desired trajectory $y^*$ represents a trajectory that approaches or approximates the reference r and that the machine 10 is capable of following. The tracking model $H_m$ can take the form of a second order system with desired natural frequency ($\omega_0$) and damping ($\zeta$). The function $T(z^{-1})$, therefore, has a unit static gain between $y^*$ and y to compensate between regulation dynamics defined by $P(z^{-1})$ and tracking dynamics defined by the poles of the reference model ($A_m$):

$$T(z^{-1})=G \times P(z^{-1}) \quad (8)$$

Where $$G = \begin{cases} \frac{1}{B(1)} & \text{if } B(1) \neq 0 \\ 1 & \text{if } B(1) = 0 \end{cases} \quad (9)$$

Having R, S and T and a desired trajectory $y^*$ we obtain a control law of the form:

$$S(z^{-1})u(t)+R(z^{-1})y(t)=T(z^{-1})y^*(t+d+1) \quad (10)$$

Figure 5:
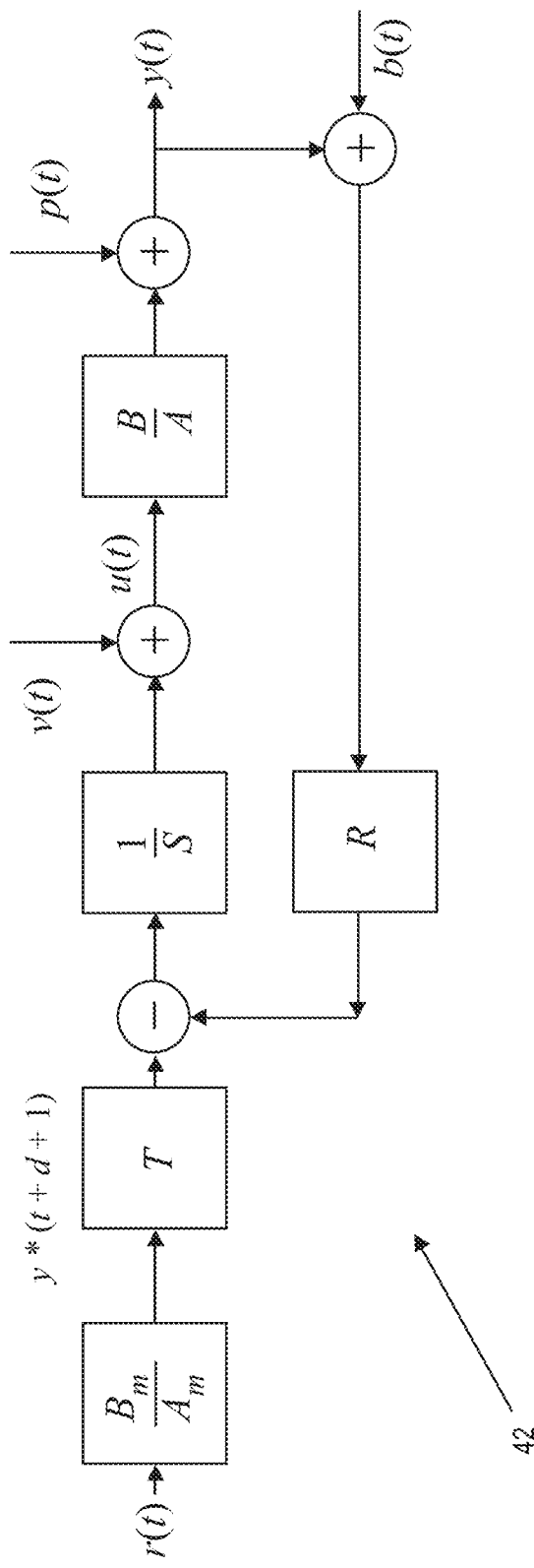
FIG. 5 is a block diagram of a digital canonical controller for tracking and regulation for use in the mobile machine of FIG. 1.

To take into account uncertainties in the control design, the structure 40 depicted in FIG. 3 can be extended to structure 42 depicted in FIG. 5 where p(t) represents disturbances on the plant itself, such as strong winds or stones that move the machine 10, b(t) represents noise and v(i)

represents disturbances on the plant input. Disturbances on the plant input u(t) may result, for example, from hardware delays or signal corruption. We can obtain the following output ($S_{yp}$), input ($S_{up}$), noise ($S_{yb}$) and disturbance ($S_{yv}$) sensitivity functions:

$$S_{yp}(z^{-1}) = \frac{A(z^{-1})S(z^{-1})}{A(z^{-1})S(z^{-1}) + B(z^{-1})R(z^{-1})} \quad (11)$$

$$S_{up}(z^{-1}) = \frac{-A(z^{-1})R(z^{-1})}{A(z^{-1})S(z^{-1}) + B(z^{-1})R(z^{-1})}$$

$$S_{yb}(z^{-1}) = \frac{-B(z^{-1})R(z^{-1})}{A(z^{-1})S(z^{-1}) + B(z^{-1})R(z^{-1})}$$

$$S_{yv}(z^{-1}) = \frac{B(z^{-1})S(z^{-1})}{A(z^{-1})S(z^{-1}) + B(z^{-1})R(z^{-1})}$$

The common denominator in these equations is the characteristic equation of the closed loop system of equation (1). The noise sensitivity function ($S_{yb}$) with a negative sign is also known as the complementary sensitivity function and from equation (11) we see that $S_{yp} - S_{yb} = 1$. Furthermore, the robustness of the closed-loop system can be evaluated by the distance of the critical point [−1, j0] to the Nyquist plot of the nominal plant and by the frequency characteristics of the sensitivity functions (equation (11)). The elements that help to evaluate this robustness are the four margins gain, phase, delay and modulus.

The modulus margin is very important because it defines the maximum admissible value of the output sensitivity function $S_{yp}$ and defines the tolerance with respect to non-linear or time varying elements that may belong to the system. A good modulus margin also guarantees good values for the gain and phase margins. The modulus margin $\Delta M$ is the inverse of the maximum of the output sensitivity function $S_{yp}$. Typical values for a good modulus margin are $\Delta M \geq 0.5(-6 \text{ dB})$.

Therefore, these margins are used to shape the frequency characteristics of the sensitivity functions $S_{yp}$ and $S_{up}$ to ensure both robustness and closed loop performance. To be able to shape the sensitivity functions using pole placement, fixed parts must be introduced into the Bezout polynomial equation (equation (3)) as follows:

$$P(z^{-1}) = A(z^{-1})H_S(z^{-1})S'(z^{-1}) + z^{-d}B(z^{-1})H_R(z^{-1})R'(z^{-1}) \quad (12)$$

The solution to equation (12) is found the same way equation (3) is solved using equation (5), after replacing $A(z^{-1})$ with $A'(z^{-1}) = A(z^{-1})H_S(z^{-1})$ and $B(z^{-1})$ with $B'(z^{-1}) = B(z^{-1})H_R(z^{-1})$ with the following new conditions:

$$n_P = \deg P(z^{-1}) \leq n_A + n_{H_S} + n_B + n_{H_R} + d - 1$$

$$n'_S = \deg S'(z^{-1}) = n_B + n_{H_R} + d - 1$$

$$n'_R = \deg R'(z^{-1}) = n_A + n_{H_S} - 1 \quad (13)$$

The input sensitivity function ($S_{up}$) reflects the actuator stress, therefore it is advantageous to limit its magnitude at high frequencies. By plotting the inverse of its magnitude $|S_{up}(e^{-j\omega})|$, we check and impose an upper bound maximum by imposing the prefixed value $H_R(z^{-1})$ shown in equation (14), which, for example, makes $|S_{up}| = 0$ at $0.5 f_s$ by choosing $\beta = 1$, where $f_s$ is the sampling frequency.

$$H_R(z^{-1}) = 1 + \beta z^{-1}; 0 \leq \beta \leq 1 \quad (14)$$

The noise sensitivity function ($S_{yp}$) is related to the delay margin $\Delta \tau$ and, considering $\Delta \tau = T_S$, a frequency template of a digital integrator is imposed of the form:

$$|S_{yb}^{-1}(z^{-1})| dB < -20 \log|1 - z^{-1}|; z = e^{j\omega}; 0 \leq \omega \leq \pi \quad (15)$$

As previously mentioned, a typical value for a good modulus margin is $\Delta M \geq 0.5(-6 \text{ dB})$. Applying that to the output sensitivity function ($S_{yp}$) results in $$|S_{yp}(z^{-1})| \leq \Delta M; z = e^{j\omega}; 0 \leq \omega \leq \pi \quad (16)$$

Furthermore, we can use the complementary function defined by $S_{yp}(z^{-1}) = 1 \; S_{yb}(z^{-1})$ and with the use of triangle inequality impose an upper and lower delay margin defined by the following equation:

$$1 - |S_{yb}(z^{-1})| \leq |S_{yp}(z^{-1})| \leq 1 + |S_{yb}(z^{-1})| \quad (17)$$

By substituting equation (15) into equation (17) we obtain equation (18):

$$1 - |1 - z^{-1}|^{-1} \leq |S_{yp}(z^{-1})| \leq 1 + |1 - z^{-1}|^{-1} \quad (18)$$

Again, in order to find a closed loop function that fits inside the upper and lower bounds of the template defined by equations (16) and (17), specified parts for $H_S$ are chosen. For example making $H_S = 1 - z^{-1}$ introduces a zero at the zero frequency allowing perfect rejection of constant disturbances.

Figure 6:
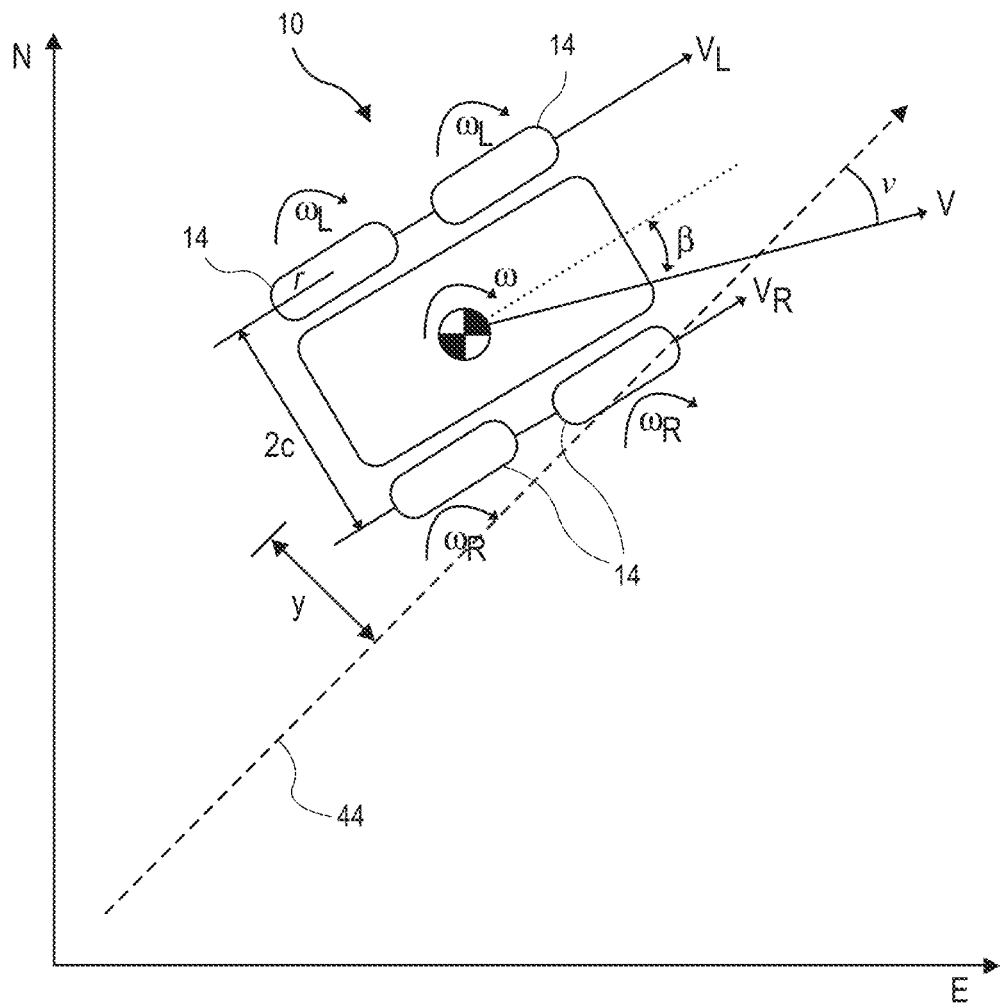
FIG. 6 is a diagram of the machine of FIG. 1 illustrating various operational variables and parameters.

FIG. 6 illustrates the machine 10 where y is the lateral position to a desired path 44 and is the variable to be controlled. The yaw rate of the robot (ω) and its linear velocity (V) result from the difference between the velocities of the right and left axis ($V_R$ and $V_L$ respectively), where β represents the angle between the velocity vector to the longitudinal axis of the machine 10. The angular velocities of the right and left wheels are represented by $\omega_R$ and $\omega_L$, respectively, and the distance between the left and right wheels is 2c. The angle with respect to the desired path is represented by v, and r is the wheel radius.

From a kinematic point of view, the yaw rate (at the center of gravity of the machine 10) and the linear velocity can be defined using the following equations:

$$V = r \times \frac{\omega_L + \omega_R}{2} \quad (19)$$

$$\omega = r \times \frac{-\omega_L + \omega_R}{2c} \quad (20)$$

Rewriting equation (20) into right and left velocities results in equation (21), and by defining a time delay τ we can find a first order yaw-rate transfer function as set forth in equation (22).

$$\omega = \frac{V_R - V_L}{2c} = \frac{\Delta V}{2c} \quad (21)$$

$$G_\omega(s) = \frac{\omega(s)}{\Delta V(s)} = \frac{1/2c}{\tau \cdot s + 1} \quad (22)$$

Finally, using the z-transform we obtain the following digital transfer function:

$$G_\omega(z^{-1}) = \frac{b_{r_1} z^{-1}}{1 + a_{r_1} z^{-1}} \quad (23)$$

Where $$b_{r_1} = \frac{1}{2c} \times (1 - e^{-\frac{T_s}{\tau}}) \qquad (24)$$

$$a_{r_1} = -e^{-\frac{T_s}{\tau}}$$

Generally speaking, the lateral position y with respect to a desired path is related to the yaw rate of the vehicle in the form of equation (25), where β is the side slip angle and ν is the course angle with respect to the desired path (see FIG. 3).

$$\dot{y} = V \sin \nu$$

$$\dot{\nu} = \omega + \dot{\beta} \qquad (25)$$

Neglecting side slip, linearizing and using the small angle approximation equation (26) can be used to find the transfer function of the lateral position with respect to the yaw rate.

$$G_y(s) = \frac{y(s)}{\omega(s)} = \frac{V}{s^2} \qquad (26)$$

The z-transform can be used to obtain the following digital transfer function of the lateral position with respect to the yaw rate:

$$G_y(z^{-1}) = \frac{b_{l_0} + b_{l_1} z^{-1}}{1 + a_{l_1} z^{-1} + a_{l_2} z^{-2}} \qquad (27)$$

where $$b_{l_0} = V \times T_s^2 / 2$$

$$b_{l_1} = V \times T_s^2 / 2$$

$$a_{l_1} = -2$$

$$a_{l_2} = 1 \qquad (28)$$

Multiplying equations (23) and (27) results in a digital model of the lateral position with respect to a desired path of the machine 10 to be used for the RST controller design, as set forth in equation (29):

$$G_{\frac{B}{A}} = \frac{b_2 z^{-2} + b_3 z^{-3}}{1 + a_1 z^{-1} + a_2 z^{-2} + a_3 z^{-3}} \qquad (29)$$

where $$b_2 = b_{r_1} \times b_{l_0}$$

$$b_3 = b_{r_1} \times b_{l_1}$$

$$a_1 = a_{l_1} + a_{r_1}$$

$$a_2 = 1 + a_{l_1} \times a_{r_1}$$

$$a_3 = a_{r_1} \qquad (30)$$

For the controller design, we assume the machine 10 drives at a constant speed of 0.5 meters per second, the sampling time of the digital system is 100 milliseconds, the track width is 0.455 meters and the time constant (τ) is 100 milliseconds (see Table 1).

TABLE 1

| Technical data of a skid-steered robot | |
|---|---|
| $T_s$ | 0.1 meters/second |
| τ | 0.1 |
| 2c | 0.455 meters |
| V | 0.5 meters/second |

Substituting the data from Table 1 into equations (24), (28) and (30) results in the following plant model parameters:

$$d = 0$$

$$B(z^{-1}) = 0.003473 z^{-2} + 0.003473 z^{-3}$$

$$A(z^{-1}) = 1 - 2.368 z^{-1} + 1.736 z^{-2} - 0.3679 z^{-3} \qquad (31)$$

The fixed parts represented in equation (32) are used to shape the sensitivity functions, and the new poles and zeros to be used in the right part of the Bezout equation (12) are expressed in equation (33):

$$H_R(z^{-1}) = 1 + 1.0 z^{-1}$$

$$H_S(z^{-1}) = 1 - 0.5 z^{-1} \qquad (32)$$

$$B'(z^{-1}) = 0.003473 z^{-2} + 0.006946 z^{-3} + 0.003473 z^{-4}$$

$$A'(z^{-1}) = 1 - 2.868 z^{-1} + 2.92 z^{-2} - 1.236 z^{-3} + 0.1839 z^{-4} \qquad (33)$$

For the regulation dynamics we use $T_s = 0.1$, $\omega_0 = 0.8$, $\zeta = 1.0$ and $\alpha_1 = \alpha_2 = -0.5$ and so the left part of the Bezout equation (12) appears as follows:

$$P(Z^{-1}) = P_D \cdot P_F = (1 - 1.846 z^{-1} + 0.8521 z^{-2}) \cdot (1 - 0.5 z^{-1})^2 \qquad (34)$$

For the tracking dynamics we use $T_s = 0.1$, $\omega_0 = 2.0$, and $\zeta = 1.0$ to find the following parameters of the reference model $H_m$:

$$Bm(z^{-1}) = 0.01752 z^{-1} + 0.01534 z^{-2}$$

$$Am(z^{-1}) = 1 - 1.637 z^{-1} + 0.6703 z^{-2} \qquad (35)$$

Finally, using these results to solve equations (5) and (8) results in the following parameters R, S and T:

$$R(z^{-1}) = 1 - 0.4784 z^{-1} + 0.04941 z^{-2} - 0.005427 z^{-3} - 0.01235 z^{-4}$$

$$S(z^{-1}) = 8.788 - 6.796 z^{-1} - 7.374 z^{-2} + 6.903 z^{-3} - 1.308 z^{-4}$$

$$T(z^{-1}) = 144 - 409.7 z^{-1} + 424.4 z^{-2} + 189.1 z^{-3} - 30.67 z^{-4} \qquad (36)$$

Figure 7:
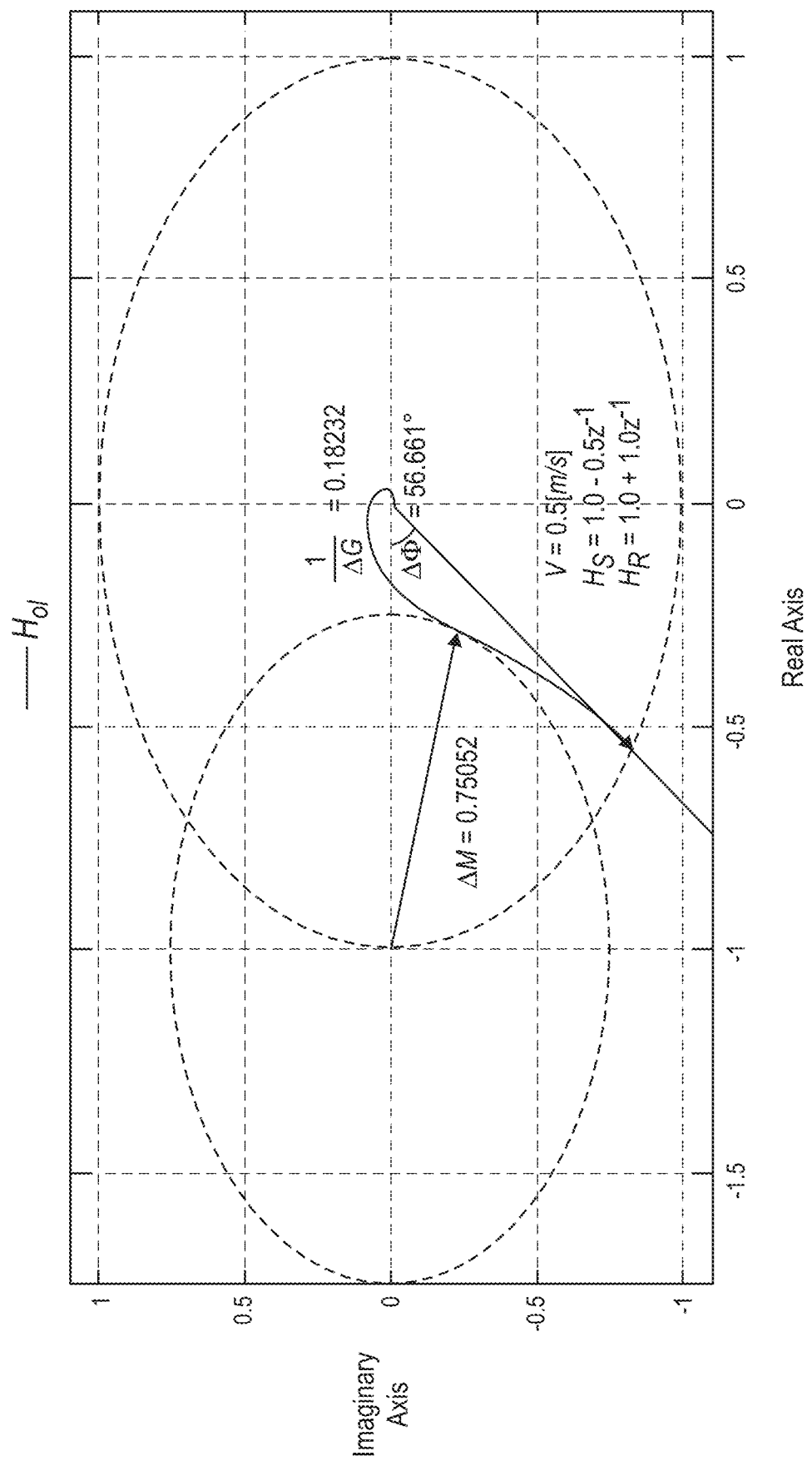
FIG. 7 is a Nyquist plot illustrating a good modulus margin relating to a control function of the machine of FIG. 1 implying stable gain and phase margins.

With these results the robustness of the design for the different sensitivity functions can be proven. FIG. 7 illustrates the Nyquist plot of the open loop function $H_{ol} = S_{yp}^{-1} - 1$. Since the critical point [−1, j0] is at the left of the plot the open loop system has no unstable poles. Here, the inverse of the gain margin 1/ΔG and the phase margin ΔΦ are stability margins with respect to the critical point. It can be seen that the modulus margin ΔM is the radius of a circle centered at the critical point and tangent to the Nyquist plot, which indicates the distance between $H_{ol}$ and the critical point. Therefore, a good modulus margin (for example, ΔM≥0.5) implies stable gain and phase margins.

Figure 8:
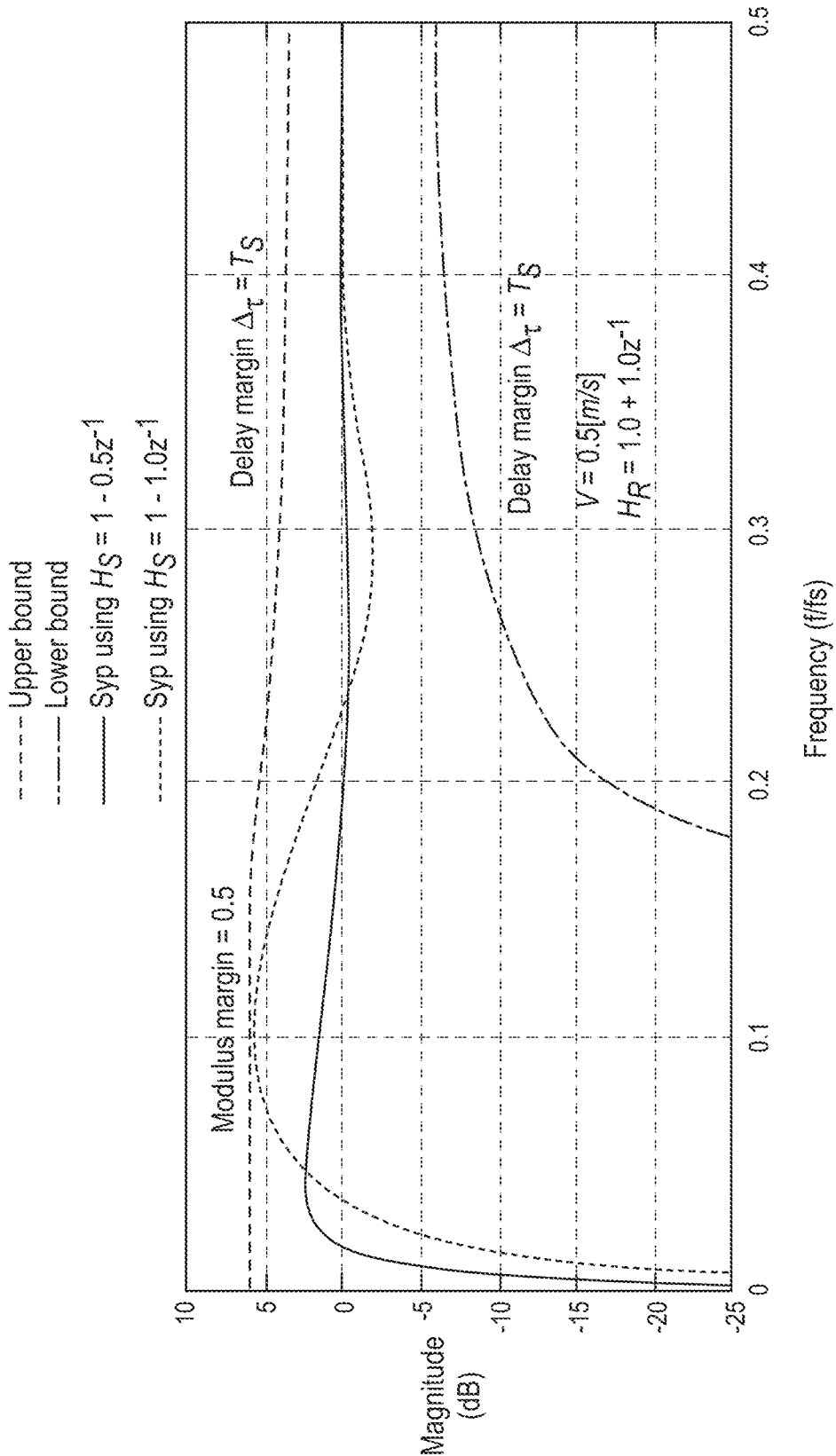
FIG. 8 is a graph illustrating applied modulus and delay margins to an output sensitivity function implemented by a communication and control system of the machine of FIG. 1.

FIG. 8 illustrates the applied modulus and delay margins to the output sensitivity function $S_{yp}$. The upper left bound is built by a modulus margin ΔM=0.5(−6 dB) (equation (16))

and the upper right and lower bounds represent the limits of the delay margin (equation (18)) which is more restrictive at higher frequencies than the modulus margin. The output sensitivity function is the result of imposing the fixed part $H_S(z^{-1})$ to the pole placement design (equation (32). It can be seen that using different values for the fixed part $H_S$ will shape the output sensitivity function differently. It can also be seen that, although using $H_S=1-1z^{-1}$ will reject constant disturbances in steady state, the shaped $S_{yp}$ is closer to the upper margin. This will make the system less tolerant to changes on the system dynamics at lower frequencies and to fix that we should impose slower regulation dynamics (for example, $\omega_0<0.8$). On the other hand, using $H_S=1-0.5z^{-1}$ will decrease the gain, making the system more tolerant to uncertainties with faster regulation dynamics.

Figure 9:
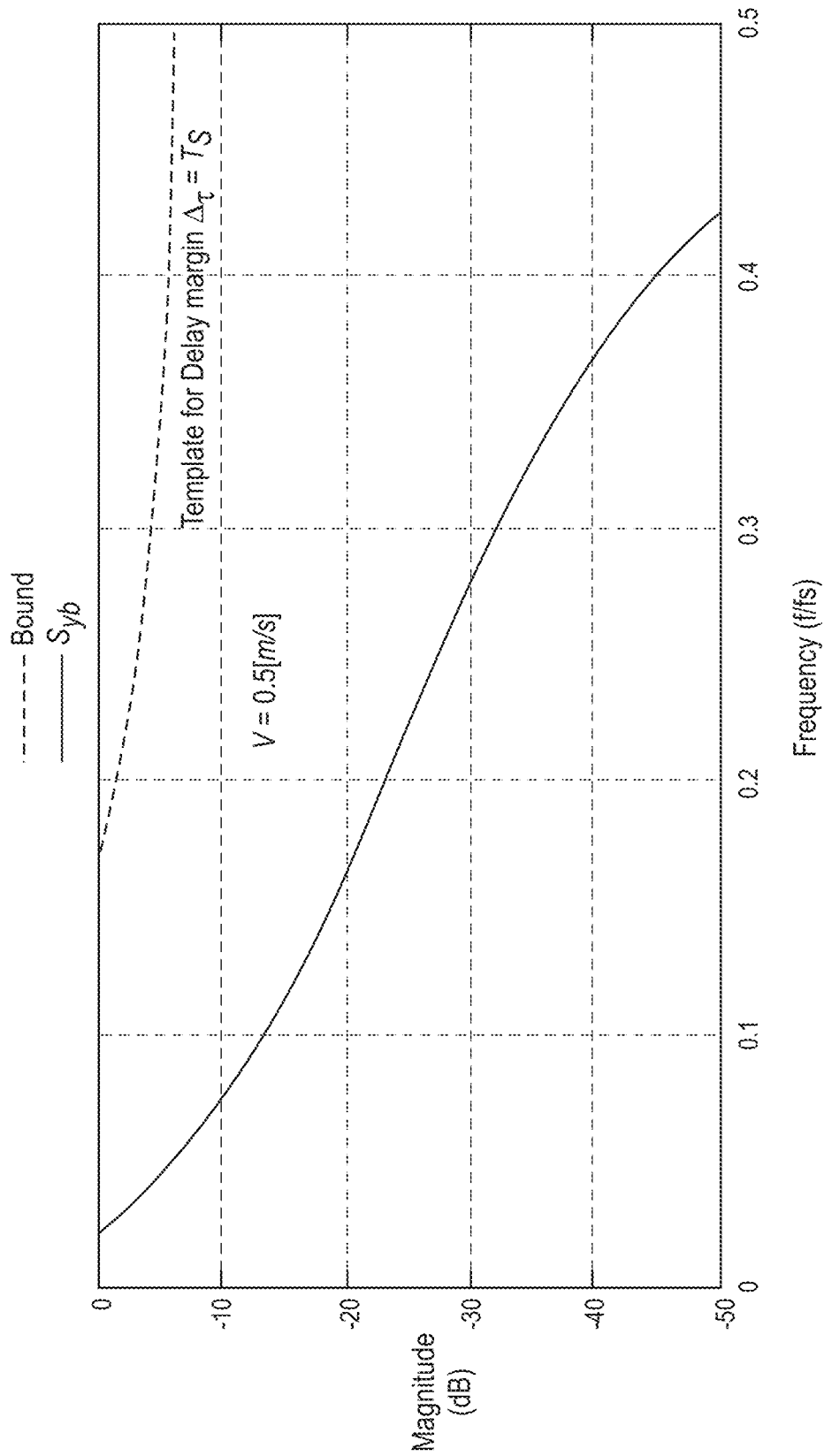
FIG. 9 is a graph illustrating a noise sensitivity function and the bound related to a delay margin implemented by a communication and control system of the machine of FIG. 1.

FIG. 9 illustrates the noise sensitivity function $S_{yb}$ and the bound related to the delay margin $\Delta\tau=T_s$ (equation (15)). The delay margin was already set for the margins of the output sensitivity function ($S_{yp}$) with favorable results (FIG. 8). Nevertheless, the delay margin is related to the noise sensitivity function and the fact that $S_{yb}$ is under the bound confirms the desirable outcome of using the fixed parts (equation (32)).

Figure 10:
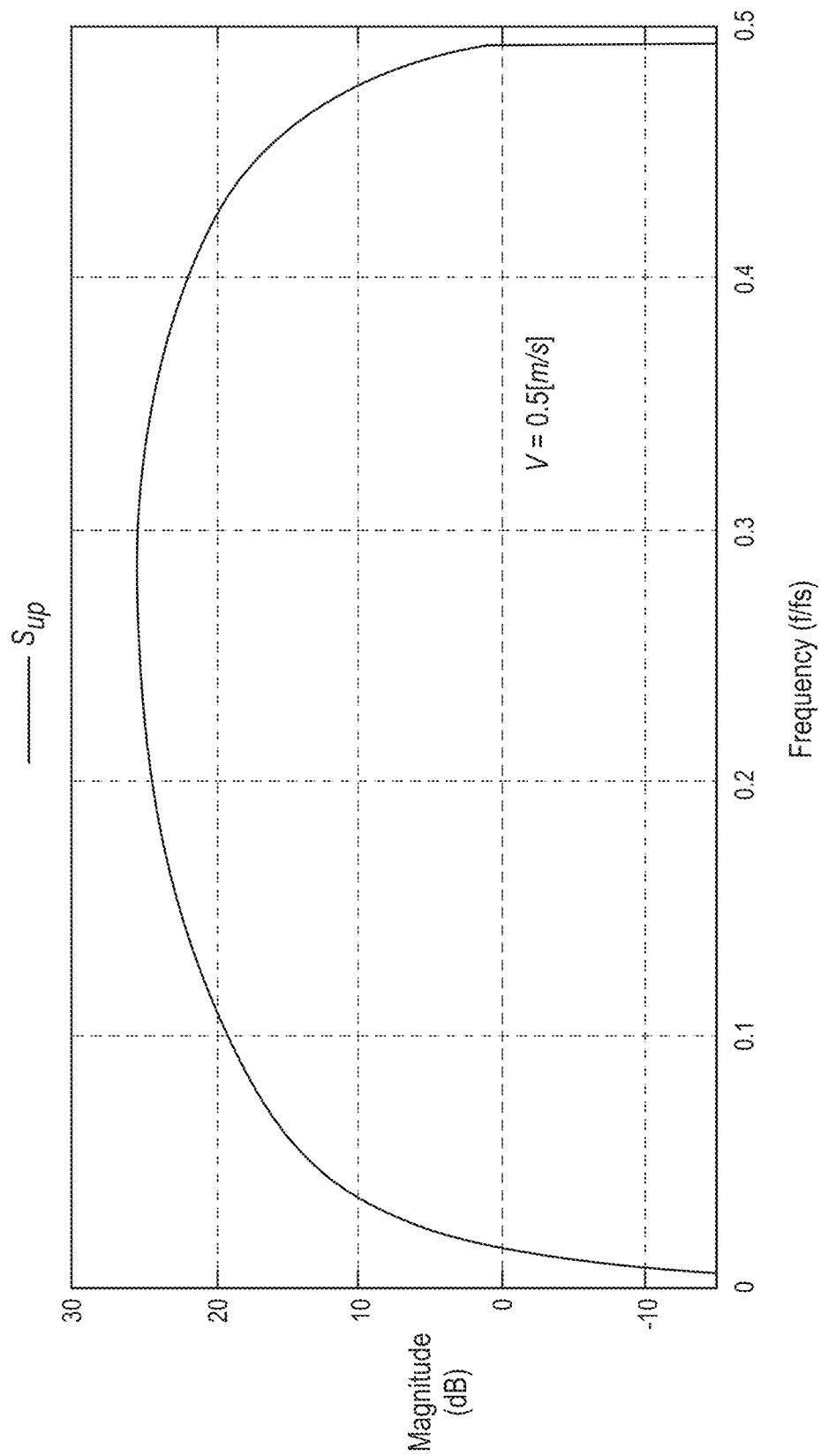
FIG. 10 is a graph illustrating the input sensitivity function for a particular pole placement as implemented by a communication and control system of the machine of FIG. 1.

FIG. 10 illustrates the input sensitivity function ($S_{up}$) for a pole placement with the fixed part $H_R=1+1z^{-1}$ (equation (32)) which imposes a zero at $0.5f_s$, reducing actuator stress at higher frequencies. This limits not only the actuator stress but also the reaction to measurement noise and disturbances making the robot drive more smoothly and not react immediately to every stone, bump or other irregularity encountered in the ground surface on which the machine 10 is operating. It will also reduce the energy consumed by the motors and increase their useful life.

Figure 11:
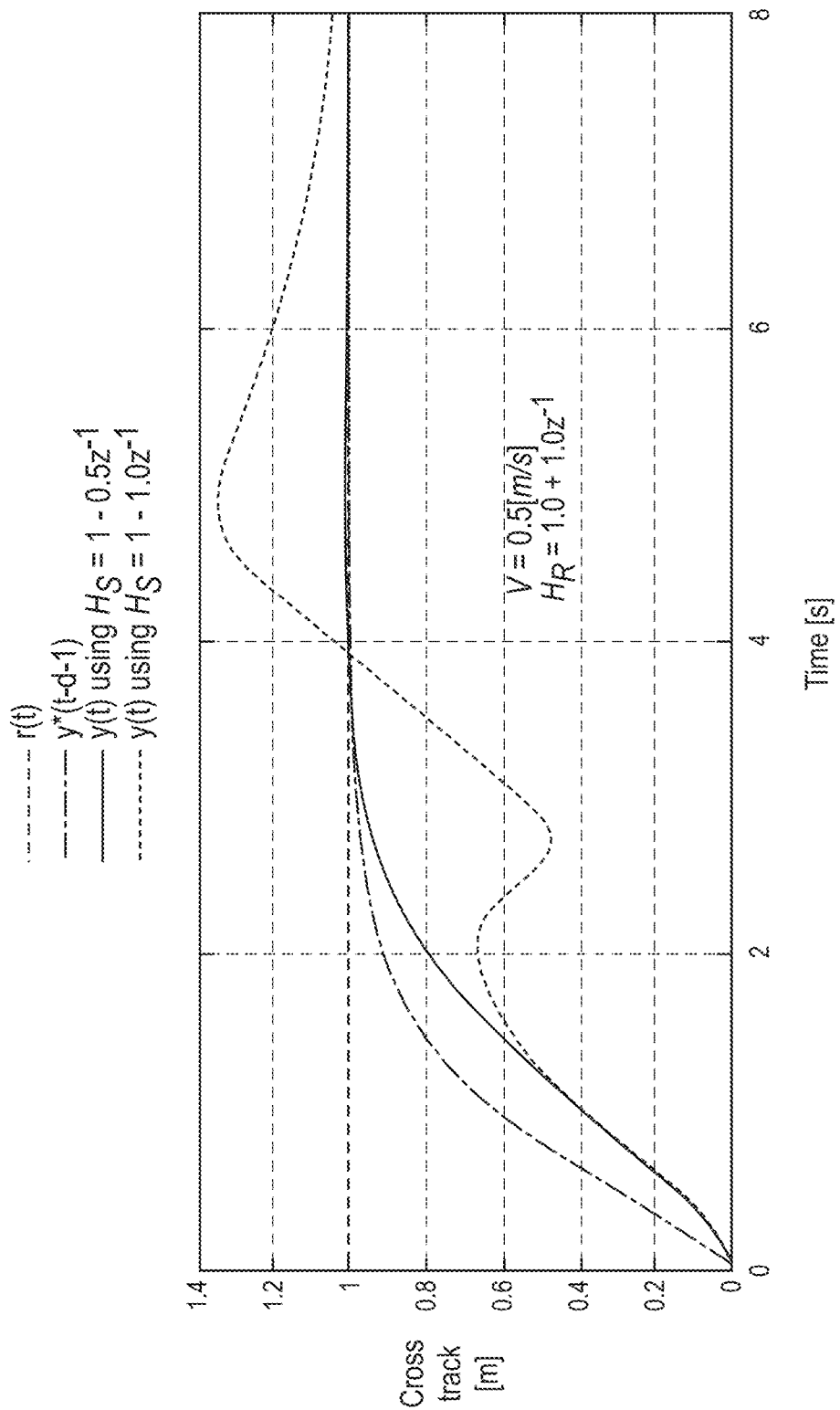
FIG. 11 is a graph illustrating step responses resulting from the different shaping of the output sensitivity function as implemented by a communication and control system of the machine of FIG. 1.

The resulting step responses of the different shaping of the output sensitivity function is illustrated in FIG. 11. It can be seen that the line corresponding to $H_S=1-0.5z^{-1}$ arrives faster at the steady state (around 4 seconds) whereas the line corresponding to $H_S=1-1.0z^{-1}$ requires more than 8 seconds and contains oscillations. As already mentioned, the oscillations can be fixed by picking slower regulation dynamics ($\omega_0 \leq 0.8$) or by driving faster. Nevertheless, the error at the turning points can be reduced by reducing the speed and to this end, it is desirable to have the system react more quickly to changes.

Figure 12:
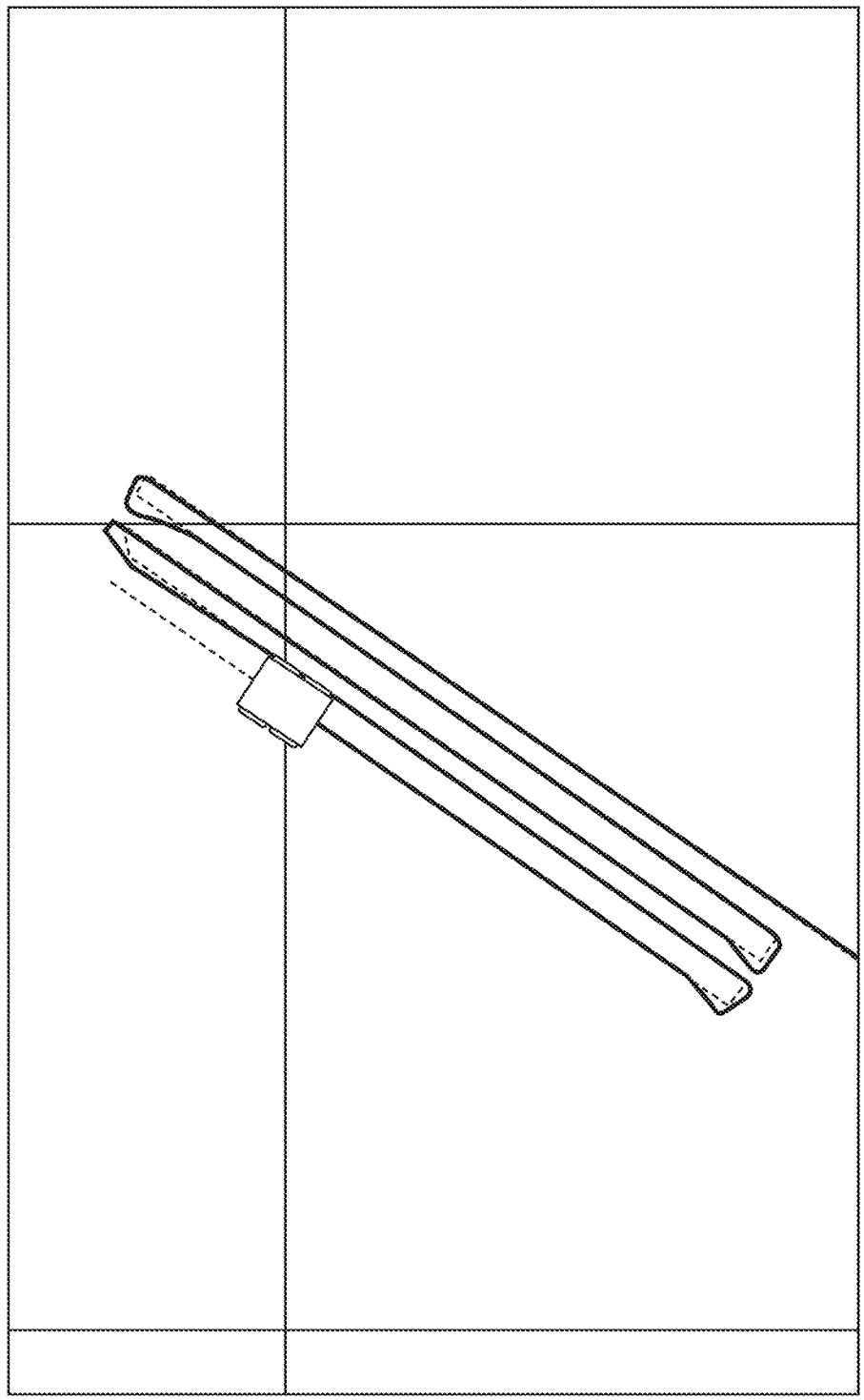
FIG. 12 illustrates the results of a simulation of a machine control method as implemented by a communication and control system of the machine of FIG. 1.

The results of a simulation using the results of equations (31), (35) and (36) is illustrated in FIG. 12. It shows representative results which are also useful to prove the robustness of the behavior in an interactive environment. For the simulation, a real path with geographic coordinates was used so we could compare these results with the results of a real robot using the same path. The simulation shows satisfactory results where the biggest error (at the fifth turning point) was around twenty centimeters, which is comparable to other, more complex, solutions. These errors at the turning points are expected since in order to be able to turn with zero curvature radius, the skid-steered robot should stop completely. In contrast, in this particular simulation the robot only reduced its velocity to 0.1 meter/second to test its robustness.

One of the advantages of the machine 10 is that the controller 20 automatically determines the tuning parameters R, S and T in real time during operation of the machine such that the control algorithm is always optimized for a current speed of the machine 10. Optimizing machine performance involves establishing a desired tradeoff between energy consumed in controlling the machine 10 and the machine's accuracy in following the desired path 44. By way of example, a particular application may require an accuracy of ten centimeters, meaning that the machine 10 should never deviate from the desired path 44 by more than ten centimeters. The controller 20 could be configured to maintain an accuracy of five centimeters but that would require a more aggressive use of system resources including more energy use, depleting the power source 32 more quickly and causing some system components, such as the actuators 22 and 24, to degrade more quickly. Configuring the controller 20 to maintain an accuracy of fifteen centimeters would result in a less aggressive use of system resources but would fall short of the target accuracy. Because the tuning parameters are determined in real time based (in part) on the machine's speed, the controller 20 is configured to control the machine 10 to use system resources just enough to maintain the target accuracy of ten centimeters. If the speed of the machine 10 fluctuates, the controller 20 automatically adjusts the values of the tuning parameters based on the speed so that the machine 10 always maintains the target accuracy without using more resources than necessary.

The natural frequency value ($\omega_0$) determines the reactiveness of the machine 10. In other words, the natural frequency value ($\omega_0$) determines how quickly the machine 10 reacts to errors in the machine's position. The damping value ($\zeta$) determines how quickly the machine 10 returns to the desired path. A lower damping value will cause the machine 10 to return to the desired path more quickly but also results in greater overshoot, while a greater damping value causes the machine to return to the desired path less quickly and results in less overshoot. The natural frequency value ($\omega_0$) and the damping value ($\zeta$) may be fixed or dynamic. The natural frequency value (coo), for example, may vary linearly between one and two depending on the machine's speed. Similarly, the damping value ($\zeta$) may vary linearly depending on the machine's speed. Alternatively, one of the natural frequency value ($\omega_0$) and the damping value ($\zeta$) may be fixed while the other varies with the speed of the machine 10.

Although the invention has been described with reference to the preferred embodiment illustrated in the attached drawing figures, it is noted that equivalents may be employed and substitutions made herein without departing from the scope of the invention as recited in the claims. The machine 10 may include four fixed wheels 14, for example, as illustrated in FIG. 1, wherein each of the wheels is in a fixed position relative to the chassis 12 of the machine 10 (in other words, the wheels 14 do not steer). The invention, however, is not so limited. Also within the ambit of the present invention is a machine with a first wheel on a first side of the machine and a second wheel on a second side of the machine, the first and second wheels being fixed relative to the chassis of the machine, and a third wheel that is steerable.

Having thus described the preferred embodiment of the invention, what is claimed as new and desired to be protected by Letters Patent includes the following:

1. An autonomous skid-steer machine for performing agricultural operations, the machine comprising—
    a chassis;
    a plurality of ground engaging elements supporting the chassis on a ground surface;
    one or more computing devices for controlling movement of the machine, the one or more computing devices configured to—
        generate a control signal for controlling operation of at least some of the plurality of ground engaging elements to cause the machine to move in a forward direction and to turn the machine, the control signal being generated according to a control algorithm incorporating tuning parameters, and automatically determine the tuning parameters in real time during operation of the machine such that the control algorithm is always optimized for a current speed of the machine, wherein the tuning parameters are found using the machine's current speed, a natural frequency value ($\omega_0$) and a damping value ($\zeta$), wherein the natural frequency value ($\omega_0$) determines reactiveness of the machine as it responds to navigational errors, wherein the damping value ($\zeta$) determines overshoot of the machine as it responds to navigational errors, wherein the natural frequency value ($\omega_0$) and the damping value ($\zeta$) are determined specifically for the characteristics of the autonomous skid-steer machine and using one or more sensitivity functions, the one or more sensitivity functions including— a first sensitivity function ($S_{yp}$) corresponding to a relationship between an output of the system y(t) and disturbances in the system p(t), a second sensitivity function ($S_{up}$) corresponding to a relationship between a steering input u(t) and the disturbances in the system p(t), a third sensitivity function ($S_{yb}$) corresponding to a relationship between an output of the system y(t) and system noise b(t), and a fourth sensitivity function ($S_{yv}$) corresponding to a relationship between the output of the system y(t) and disturbances on a plant input v(t).

2. The autonomous skid-steer machine as set forth in claim 1, the natural frequency value ($\omega_0$) varying linearly as a function of the machine's speed.

3. The autonomous skid-steer machine as set forth in claim 1, the damping value ($\zeta$) varying linearly as a function of the machine's speed.

4. The autonomous skid-steer machine as set forth in claim 1, the control signal causing the machine to follow a guidance wayline.

5. The autonomous skid-steer machine as set forth in claim 4, the control algorithm being a linear control algorithm configured to respond to disruptions in the machine's behavior caused by external disturbances by controlling the machine to return to the guidance wayline.

6. The autonomous skid-steer machine as set forth in claim 1, the one or more computing devices implementing an RST control algorithm to generate the control signal, and wherein the control parameters are R, S and T values used in the RST controller.

7. The autonomous skid-steer machine as set forth in claim 6, the one or more computing devices using the following equation to determine the values of S and R in real time:

$$P(z^{-1})=A(z^{-1})H_S(z^{-1})S'(z^{-1})+z^{-d}B(z^{-1})H_R(z^{-1})R'(z^{-1}).$$

8. The autonomous skid-steer machine as set forth in claim 6, the one or more computing devices using the following equation to determine the value of T in real time:

$$T(z^{-1})=G \times P(z^{-1}).$$

9. The autonomous skid-steer machine as set forth in claim 1, the one or more computing devices being configured such that decreasing the damping value ($\zeta$) results in increasing the overshoot, causing the machine to arrive more quickly at a target wayline but overshooting the target wayline more, while increasing the damping value ($\zeta$) results in decreasing the overshoot, causing the machine to arrive less quickly at a target wayline and overshooting the target wayline less.

10. The autonomous skid-steer machine as set forth in claim 1, the one or more computing devices being further configured to— implement a tracking function that receives a raw path plan input and generates a desired path, and generate the control signal causing the machine to follow the desired path.

11. The autonomous skid-steer machine as set forth in claim 10, the tracking function including a second-order filter that determines how quickly the machine reacts to a change in direction of the raw path plan input.

12. The autonomous skid-steer machine as set forth in claim 1, the plurality of ground engaging elements including at least one wheel on a first side of the machine in a fixed position relative to the chassis and at least one wheel on a second side of the machine in a fixed position relative to the chassis.

13. The autonomous skid-steer machine as set forth in claim 1, the plurality of ground engaging elements including at least one wheel on a first side of the machine in a fixed position relative to the chassis, at least one wheel on a second side of the machine in a fixed position relative to the chassis, and at least one steerable wheel.

* * * * *